C. E. MURPHY & W. H. SPRAGUE.
TRANSMISSION GEARING.
APPLICATION FILED NOV. 6, 1914.

1,159,410.

Patented Nov. 9, 1915.
2 SHEETS—SHEET 1.

Witnesses
J. H. Crawford
R. M. Smith

Inventors
C. E. Murphy,
W. H. Sprague,
By Victor J. Evans
Attorney

C. E. MURPHY & W. H. SPRAGUE.
TRANSMISSION GEARING.
APPLICATION FILED NOV. 6, 1914.

1,159,410.

Patented Nov. 9, 1915.
2 SHEETS—SHEET 2.

Witnesses
J.H. Crawford
P.M. Smith

Inventors
C.E. Murphy,
W.H. Sprague,
By Victor J. Evans
Attorney

COLUMBIA PLANOGRAPH CO., WASHINGTON, D. C.

UNITED STATES PATENT OFFICE.

CHARLES E. MURPHY AND WILLIAM H. SPRAGUE, OF CHILLICOTHE, MISSOURI.

TRANSMISSION-GEARING.

1,159,410.  Specification of Letters Patent.  Patented Nov. 9, 1915.

Application filed November 6, 1914. Serial No. 870,651.

*To all whom it may concern:*

Be it known that we, CHARLES E. MURPHY and WILLIAM H. SPRAGUE, citizens of the United States, residing at Chillicothe, in the county of Livingston and State of Missouri, have invented new and useful Improvements in Transmission - Gearing, of which the following is a specification.

This invention relates to transmission gearing and is especially designed for use on automobiles, motor trucks and other engine propelled vehicles.

The particular object of the present invention is to produce a novel and efficient construction and arrangement of friction gearing capable of being readily thrown into and out of operation and also adapted to be operated in such manner as to vary to any desired extent the relative rotative speeds of the engine shaft and the drive shaft, the latter leading to the driving axle of the machine to which it is connected by the usual differential gearing. By means of the gearing hereinafter particularly described, the drive shaft may be rotated directly with and at the same speed as the engine shaft or at any lower speed or it may be rotated in a reverse direction.

With the above and other objects in view, the invention consists in the novel construction, combination and arrangement of parts, as will hereinafter be more fully described, illustrated and claimed.

Figure 1:
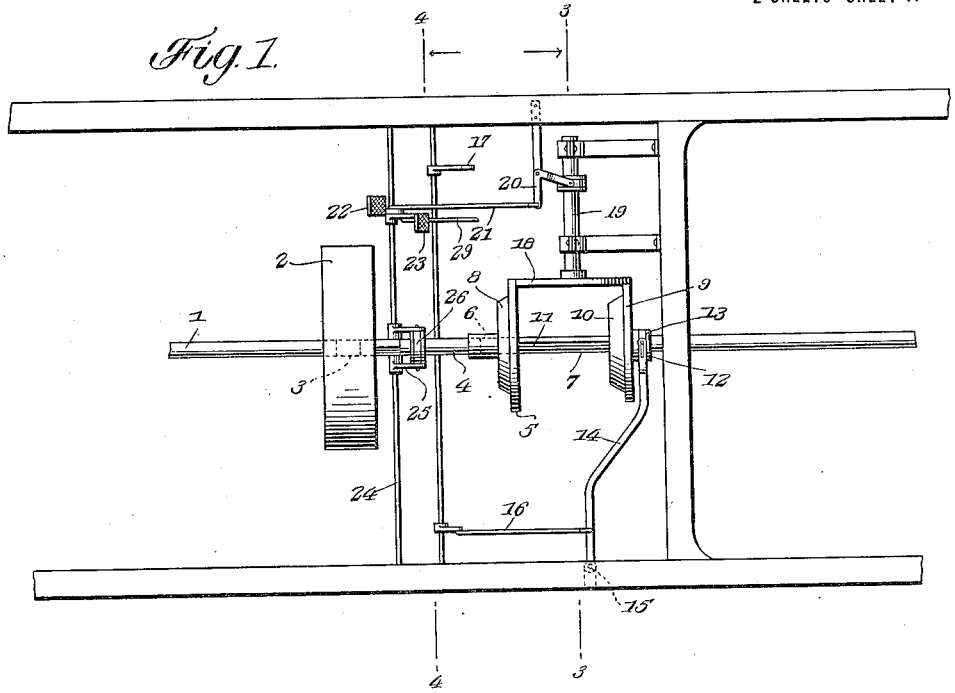
Figure 3:
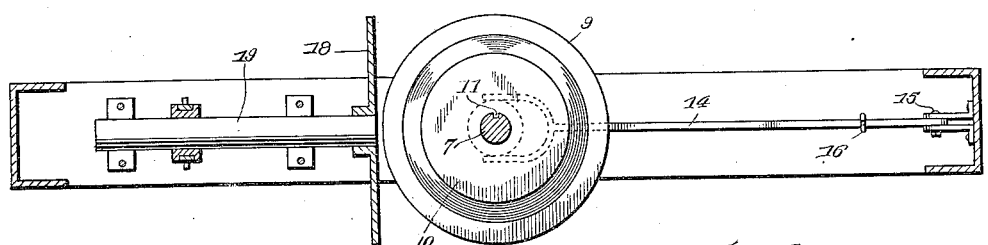
Figure 5:
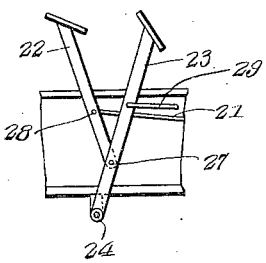
Figure 2:
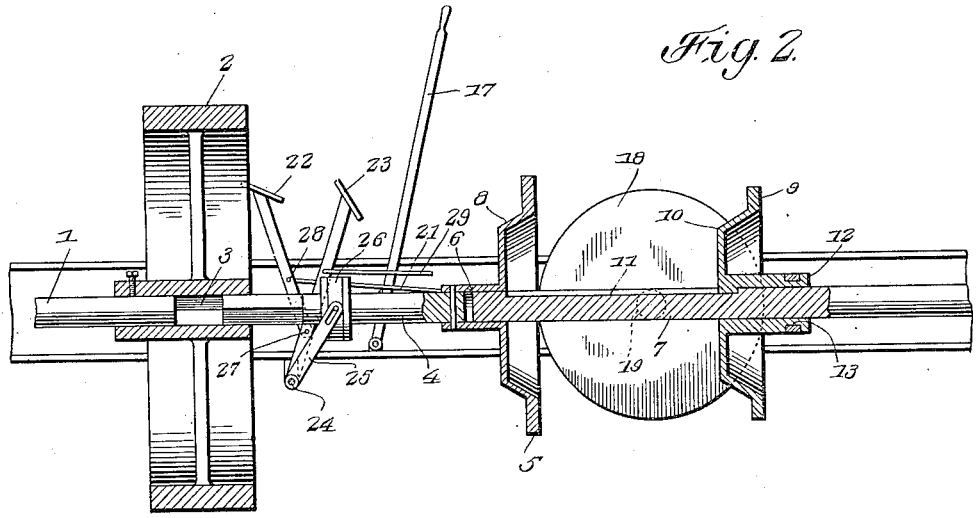
Figure 4:
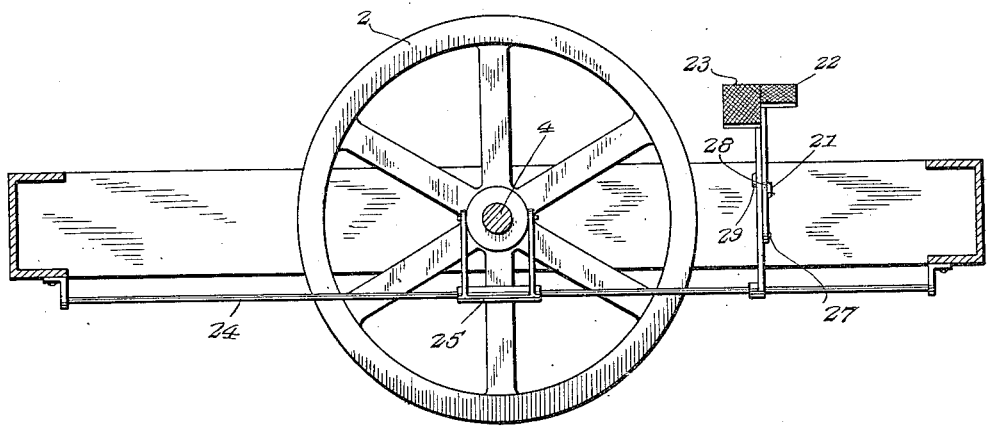

In the accompanying drawings:—Figure 1 is a plan view of a sufficient portion of the chassis of an automobile to illustrate the application of the improved transmission gearing thereto. Fig. 2 is a vertical longitudinal section through the same. Fig. 3 is a cross section taken in line with the shaft of the friction transmission wheel on the line 3—3 of Fig. 1. Fig. 4 is a vertical cross section taken in line with the foot operated rock shaft, on the line 4—4 of Fig. 1. Fig. 5 is a fragmentary elevation showing the foot lever controls and the brake rod or connection.

Referring to the drawings 1 designates the engine shaft provided with the usual fly-wheel 2, the latter being formed with a squared central recess or bore 3 to receive the correspondingly squared adjacent end of the transmission or jack shaft 4.

The transmission shaft 4 has fast on its opposite end a friction driving wheel 5 and this wheel is formed with a central bore 6 to receive the adjacent extremity of the drive shaft 7. It will be understood that the drive shaft 7 extends to the differential gearing within the housing of the rear driving axle the same as in the present automobile practice. The present invention resides in the means for transmitting motion from the engine shaft 1 to the drive shaft 7 at different speeds and in different directions.

In carrying out the present invention, the friction driving wheel 5 is provided with a female cone 8 and mounted slidingly on the same shaft 7 is a friction driven wheel 9 carrying or provided with a male cone 10 which is adapted to coöperate with the cone 8 when the wheel 9 is moved into frictional engagement with the wheel 5 by sliding the wheel 9 longitudinally of the shaft 7.

The wheel 9 is connected to the shaft 7 by means of a long key 11 so as to rotate constantly with said shaft and in order to provide for sliding said wheel 9 along the shaft 7, the wheel 9 is provided with a hub 12 formed with a groove 13 to receive the inturned ends of a shifting fork 14 pivotally connected at its outer end as shown at 15 to the frame or chassis. From the fork 14 a connecting rod 16 extends longitudinally of the machine to a hand operated gear shift lever 17 fulcrumed on the machine frame within convenient reach of the operator in his seat.

Coöperating with both of the wheels 5 and 9 is an intermediate friction transmission wheel 18 which revolves on an axis at right angles to the shaft 7 and is carried by a shaft 19 extending transversely of the frame, said shaft being operatively connected to an end thrust lever 20 shown in the form of a bell crank lever. From this end thrust lever 20 a connecting rod 21 extends to and has a jointed connection with the friction drive lever 22 hereinafter more particularly referred to.

By reference to Fig. 1 it will be seen that the face of the wheel 5 operates against the periphery of the wheel 18 and the latter in turn operates against the periphery of the wheel 9, the wheel 9 being shiftable lengthwise of the shaft 7 while the wheel 18 is shiftable perpendicularly to the shaft 7 so as to make and break contact with the periphery of the wheel 9, while the wheel 5 is shiftable in the direction of length of the transmission shaft 4 into and out of contact with the periphery of the wheel 18. In order to shift the shaft 4 and the wheel 5, I provide a foot operated release lever 23 which is fast on a horizontal rock shaft 24 journaled in suitable bearings below and extending at right angles to the transmission shaft 4. The rock shaft 24 is provided with a fork 25 which engages a grooved collar 26 fast on the shaft 4. Therefore, as the lever 23 is moved in a forward or backward direction, the shaft 4 and also the wheel 5 are shifted in a corresponding direction.

The friction drive lever 22, it will be noted, is shorter than the lever 23 and is pivotally connected to the lever 23 at 27, while the connecting rod 21 is pivotally connected at 28 to the lever 22 between the ends thereof.

In operation, the release lever 23 is pressed forwardly and through the connections described, the shaft 4 and the wheel 5 are simultaneously moved in the same direction, throwing the wheel 5 out of engagement with the wheel 18. This has the effect of disconnecting the engine shaft from the drive shaft so that the engine runs free without propelling the machine. To throw the transmission gearing into operation, the operator presses forwardly on the friction drive lever 22. This on account of being connected to the rod 21 and the lever 23, has the effect of moving the lever 23 rearwardly, thereby carrying the wheel 5 into engagement with the wheel 18 and at the same time through the rod 21 and end thrust lever 20, throwing the wheel 18 into frictional engagement with the wheel 19. Motion is thus imparted from the engine shaft 1 to the drive shaft 7, the last named shaft being driven at a speed in accordance with the position which the periphery of the wheel 9 occupies with respect to the center of the wheel 18. The nearer the wheel 9 is to the center of the wheel 18, the slower the shaft 7 will be rotated and the nearer the periphery of the wheel 18, the faster will be the speed of the shaft 7. By shifting the wheel 9 to the opposite side of the center of the wheel 18, the drive shaft 7 will be revolved in the opposite direction from the shaft 1. By shifting the wheel 9 tightly against the wheel 5 so as to throw the cones 8 and 10 into frictional engagement with each other, the wheel 5 will be moved out of contact with the periphery of the wheel 18 and a direct drive will be obtained between the engine shaft 1 and the drive shaft 7.

The working faces of all of the friction wheels hereinabove described may be covered with friction material of any desired or preferred kind in order to obtain the requisite frictional hold and engagement with and upon each other. In close coupler cars or cars embodying a short wheel base, the fly-wheel 2 may be used as and in place of the friction wheel 5 and may be provided itself with the female cone 8.

29 designates a rod or connection leading from the lever 23 rearwardly to the brake (not shown), which brake may be of any usual or preferred type and arrangement.

What we claim is:—

1. In transmission gearing for engine propelled vehicles, the combination of an engine driven shaft, and a drive shaft in longitudinal alinement therewith, a friction driving wheel fast on the engine driven shaft, means for shifting said shaft and friction driving wheel in the direction of length of the shaft, a friction driven wheel having a splined and sliding engagement with the drive shaft and movable toward and away from said friction driving wheel, a friction transmission wheel operating at right angles to and in contact with said friction driving wheel and friction driven wheel, manually controlled means for shifting said friction driven wheel across the face of the friction transmission wheel, and means for shifting said friction transmission wheel toward and away from the working face of the friction driven wheel.

2. In transmission gearing for engine propelled vehicles, the combination of an engine driven shaft, and a drive shaft in longitudinal alinement therewith, a friction driving wheel fast on the engine driven shaft, means for shifting said shaft and friction driving wheel in the direction of length of the shaft, a friction driven wheel having a splined and sliding engagement with the drive shaft and movable toward and away from said friction driving wheel, a friction transmission wheel operating at right angles to and in contact with said friction driving wheel and friction driven wheel, manually controlled means for shifting said friction driven wheel across the face of the friction transmission wheel, means for shifting said friction transmission wheel toward and away from the working face of the friction driven wheel, and coöperating male and female cone clutch faces on the friction driven wheel and friction driving wheel, respectively.

3. In transmission gearing for engine propelled vehicles, the combination of an engine driven shaft, and a drive shaft in longitudinal alinement therewith, a friction driving wheel fast on the engine driven shaft, means for shifting said shaft and friction driving wheel in the direction of length of the shaft, a friction driven wheel having a splined and sliding engagement with the drive shaft and movable toward and away from said friction driving wheel, a friction transmission wheel operating at right angles to and in contact with said friction driving wheel and friction driven wheel, manually controlled means for shifting said friction driven wheel across the face of the friction transmission wheel, means for shifting said friction transmission wheel toward and away from the working face of the friction driven wheel, a foot operated lever connected with the engine driven shaft for shifting the latter lengthwise, and a friction drive lever pivotally connected to said release lever and having a fulcrum intermediate the ends thereof.

4. In transmission gearing for engine propelled vehicles, the combination of an engine driven shaft, and a drive shaft in longitudinal alinement therewith, a friction driving wheel fast on the engine driven shaft, means for shifting said shaft and friction driving wheel in the direction of length of the shaft, a friction driven wheel having a splined and sliding engagement with the drive shaft and movable toward and away from said friction driving wheel, a friction transmission wheel operating at right angles to and in contact with said friction driving wheel and friction driven wheel, manually controlled means for shifting said friction driven wheel across the face of the friction transmission wheel, means for shifting said friction transmission wheel toward and away from the working face of the friction driven wheel, a foot operated lever connected with the engine driven shaft for shifting the latter lengthwise, a friction drive lever pivotally connected to said release lever and having a fulcrum intermediate the ends thereof, an end thrust lever for shifting the friction transmission wheel, and a connecting rod between said end thrust lever and the friction drive lever, said connecting rod forming the fulcrum of the last named lever.

In testimony whereof we affix our signatures in presence of two witnesses.

CHARLES E. MURPHY.
WILLIAM H. SPRAGUE.

Witnesses:
 J. A. HANAH,
 L. R. MATHEWS.

Copies of this patent may be obtained for five cents each, by addressing the "Commissioner of Patents, Washington, D. C."